(12) United States Patent
Hungerford et al.

(10) Patent No.: US 7,104,593 B2
(45) Date of Patent: Sep. 12, 2006

(54) LOWER BUNK FOR A VEHICLE

(75) Inventors: Michael J. Hungerford, Lake Oswego, OR (US); Corry R. Cooper, Clackamas, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 10/985,816

(22) Filed: Nov. 9, 2004

(65) Prior Publication Data
US 2005/0104415 A1    May 19, 2005

Related U.S. Application Data

(60) Provisional application No. 60/520,487, filed on Nov. 14, 2003.

(51) Int. Cl.
*B60P 3/38*      (2006.01)

(52) U.S. Cl. ................................. 296/190.02

(58) Field of Classification Search ........... 296/190.02, 296/190.08, 37.1, 37.8, 37.16, 174, 168; 5/118
See application file for complete search history.

(56) References Cited

U.S. PATENT DOCUMENTS

| | | | |
|---|---|---|---|
| 2,692,009 A | 10/1954 | Warshaver | |
| 3,722,011 A * | 3/1973 | Miller | 5/118 |
| 3,737,925 A | 6/1973 | Oxford | |
| 4,108,487 A | 8/1978 | Spohn | |
| 4,659,137 A * | 4/1987 | Chassaing et al. | 296/190.02 |
| 4,771,507 A * | 9/1988 | Draplin et al. | 16/297 |
| 5,020,173 A * | 6/1991 | Dreyer, Jr. | 5/308 |
| 5,667,115 A * | 9/1997 | Verhaeg | 224/275 |
| 5,709,329 A * | 1/1998 | Johnson | 224/402 |
| 5,902,009 A * | 5/1999 | Singh et al. | 297/188.1 |
| D428,701 S * | 8/2000 | Lamo, Jr. | D3/313 |
| 6,106,044 A * | 8/2000 | Schlachter | 296/37.15 |
| 6,386,612 B1 * | 5/2002 | Hofmann et al. | 296/37.15 |
| 6,488,327 B1 * | 12/2002 | Pearse et al. | 296/65.05 |
| 6,611,973 B1 * | 9/2003 | Connell | 5/9.1 |
| 6,644,523 B1 * | 11/2003 | Salas | 224/275 |
| 6,644,724 B1 | 11/2003 | Penaloza et al. | |
| 6,824,029 B1 * | 11/2004 | Tuel et al. | 224/275 |
| 6,837,531 B1 * | 1/2005 | Mack et al. | 296/65.09 |

* cited by examiner

*Primary Examiner*—H Gutman
(74) *Attorney, Agent, or Firm*—Klarquist Sparkman LLP

(57) ABSTRACT

A reconfigurable lower bunk apparatus for a vehicle having a sleeping compartment with a rear wall and first and second side walls is described. In one form, a mattress receiving receptacle or tray is moveably mounted to a rear wall of the vehicle to permit raising and lowering of the tray between raised and lowered positions. A storage compartment is overlaid by the tray when the tray is in the lowered position. The storage compartment may have first and second sections with one of the sections being longer than the other and desirably greater than one-half the width between the side walls of the sleeping compartment. Removable dividers may subdivide the storage compartment into respective storage sections.

20 Claims, 6 Drawing Sheets

LOWER BUNK FOR A VEHICLE

CROSS REFERENCE

This application claims the benefit of provisional patent application No. 60/520,487, filed on Nov. 14, 2003. The entire disclosure of the provisional application is considered to be part of the disclosure of the following application and is hereby incorporated by reference herein.

The present disclosure relates to a lower bunk for a vehicle and more specifically to such a bunk which may be reconfigurable.

BACKGROUND

Some vehicles, such as long haul truck-tractors, include a sleeping compartment in which one or more bunks, including a lower bunk, may be positioned.

A need exists for improvements to these known bunk configurations.

SUMMARY

In accordance with one aspect of an embodiment, a mattress receiving receptacle such as a tray, which may also receive a spring, or combined mattress and spring, may be movably coupled to a wall of the vehicle to permit raising and lowering of the mattress receiving tray to expose compartments positioned beneath the tray. In a desirable embodiment, the tray is hinged to a rear wall of the vehicle and comprises a lid for the compartments. Additional support to the mattress receiving tray may be provided by vehicle mounted side supports and a front bunk supporting member such as a beam. The beam which may extend between the sides of the vehicle and along the lower front of the tray. One or more supports, such as first and second upright supports spaced along the length of the bunk supporting member may also be provided.

A tray raising assist mechanism, such as one or more gas shocks, may be used to bias the tray to an opened position to assist in opening the bunk.

The compartment defining portion of the bunk apparatus may comprise plural sections such as a first elongated section which extends for greater than one-half the width of the vehicle compartment and a second section which is shorter and may, for example, extend the remaining distance across the vehicle compartment. The length of the second section may be adjusted to fit the width of the particular vehicle.

In accordance with another aspect of an embodiment, one or more of the compartment sections, such as desirably the elongated portion of the compartment may include divider receiving receptacles, such as slots or other divider receivers, for receiving upright dividers which subdivide the elongated compartment into various subcompartments. These dividers may comprise supports for electrical components which can be assembled onto the dividers prior to placing the dividers in the compartments. This facilitates mounting of such electrical components in place.

One end compartment section of the compartment assembly may have a plurality of apertures for admitting air therein. In addition, a heating, ventilation, air conditioning unit (HVAC) may be included in such compartment and may have an optional cover which also contains airways such that air from the interior of the vehicle may flow into the HVAC unit through the compartment. The HVAC compartment thus permits the flow of air through the compartment to the HVAC unit without the need for additional ducting. Less desirably, such ducting could be used.

The bunk supporting tray may comprise a multi-section tray having a first mattress supporting portion. In addition, the bunk supporting tray may include a lower portion which is fastened, such as by rivets or other fasteners, solvent welded or otherwise coupled to the upper portion. Projections and receptacles may be formed in the lower major surface of the upper tray portion and in the upper surface of the lower tray portion with such projections and receptacles from the respective tray sections mating with one another to provide added support to the interior regions of the bunk tray. Rigidifying side connectors may also be included. The space between the upper and lower tray sections may define wire receiving passageways, which may be enclosed, for the passage of wire to electrical modules or other electrical components. In addition, lights may be fastened to the undersurface of the lower tray section with electrical wires being coupled to the lights to provide lighting. The lights may be activated by a switch which closes to energize the lights when the tray is lifted. The bunk receiving tray may also have a latch to retain the bunk in a lowered position.

The present invention is not limited to any particular embodiment or embodiments set forth herein, nor is it limited to any particular combination or subcombination as set forth herein. Instead, the invention is directed toward all new and non-obvious features of a bunk configuration disclosed herein both alone and in all new and non-obvious combinations and subcombinations with one another.

DETAILED DESCRIPTION

Figure 1:
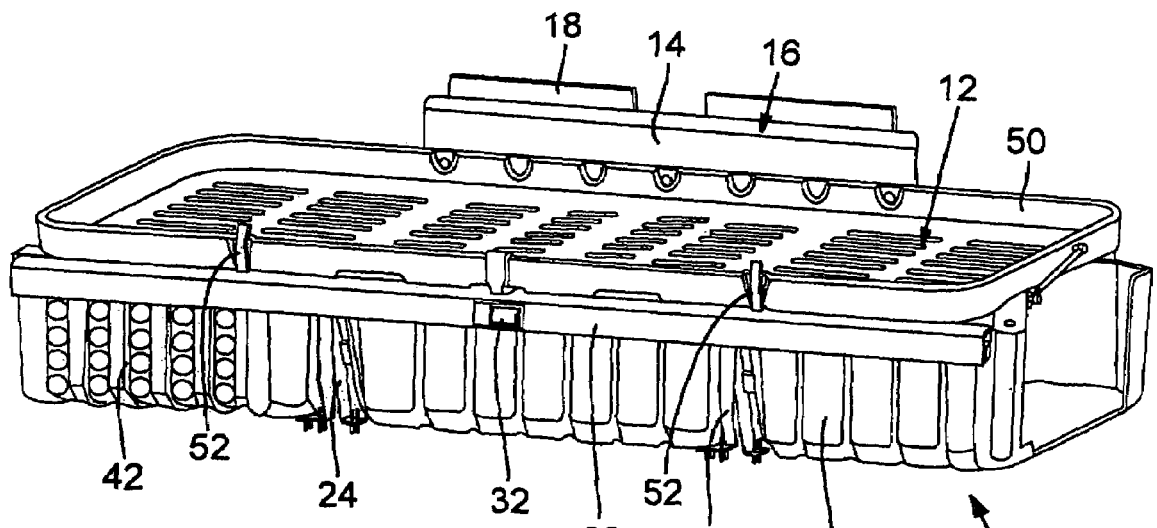
FIG. 1 is a perspective view of one embodiment of a bunk configuration.

With reference to FIG. 1, one form of a bunk structure is indicated by the number 10. The illustrated bunk structure comprises a bunk receiving tray 12 which is coupled to support structure carried by a vehicle. For example, the rear edge of tray 12 may be fastened, such as by rivets, or other fasteners, to a hinge plate 14 of a hinge 16. The other hinge plate 18 of hinge 16 is mounted to the rear wall, for example, of a vehicle to allow the tray 12 to pivot upwardly about the longitudinal axis of hinge pins of the hinge 16.

A forward support comprised of an elongated cross member 20 is desirably provided to support the front edge of the bunk receiving tray 12. First and second upright supports 22,24 are coupled at their respective upper end portions to cross support 20 and at their respective lower end portions to, for example, the floor of the vehicle. Side supports may also be provided, although not shown, in FIG. 1. To assist in opening the tray, gas shocks may be provided (or alternative biasing mechanisms) at the opposite ends of the tray 12. One such shock is indicated at 30 in FIG. 7. A latch 32 may engage the tray 12 to latch the tray in a closed position until the latch is released.

The bunk configuration of FIG. 1 also comprises plural compartment sections such as a first compartment section 40 extending from one side portion of the structure to a location which is greater than midway across the length of the structure. This particular bunk configuration also comprises a second compartment section 42 which may span the remainder of the distance across the width of the vehicle. It should be noted that compartment sections 40 and 42 may be of alternative configurations. Also, although less desirable, more than two compartment sections may be used. The compartment section 42 may be adjusted in length to fit the available space for the bunk structure.

The tray 12 illustrated in FIG. 1 has a mattress retaining lip extending at least partially around the upper periphery of the tray. Desirably, the illustrated upwardly extending flange or lip 50 extends about the entire periphery of the tray. Flange 50 assists in retaining the mattress (not shown) in the tray. Additional mattress retainers such as retaining flanges or prongs indicated at 52 in FIG. 1 may be included to grip the mattress to assist in retaining it in the tray.

Figure 2:
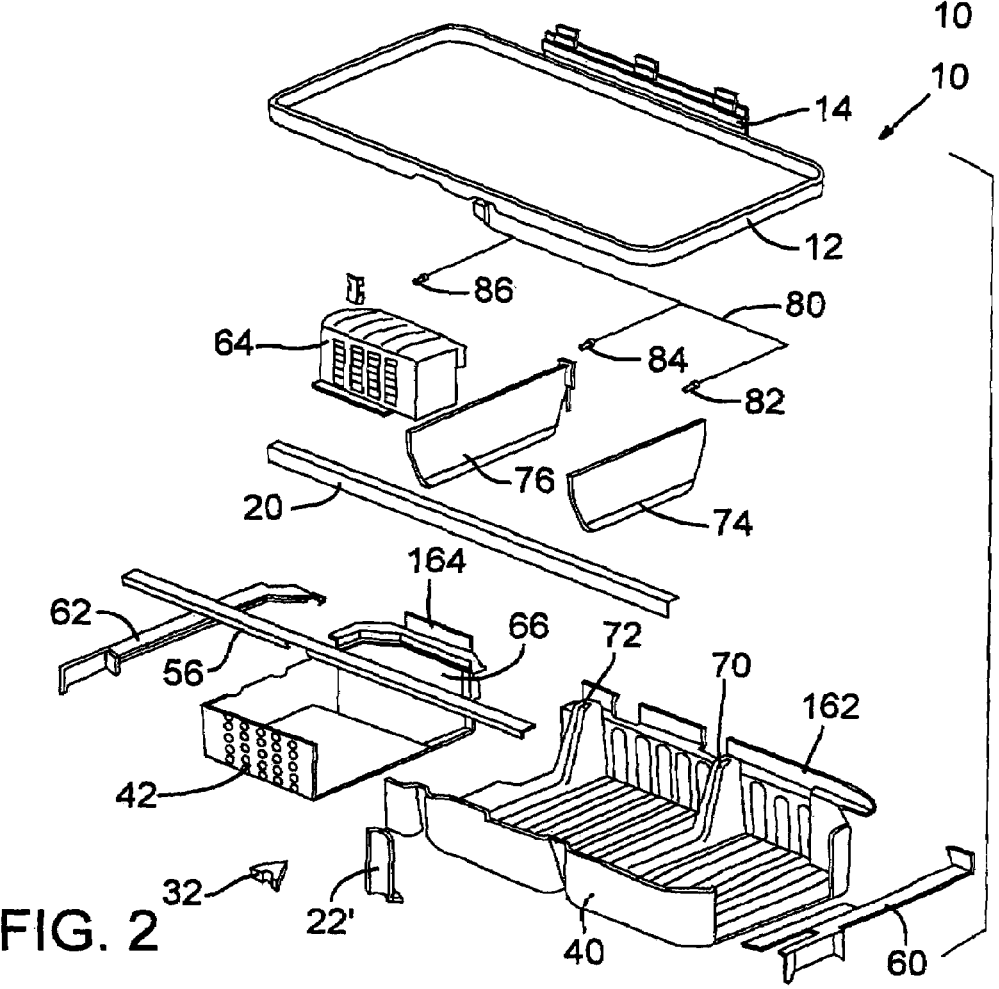
FIG. 2 is an exploded view of an alternative embodiment of a bunk configuration.

The embodiment of FIG. 2 includes only one forward support 22'. Cross support 20 may, for example, be a steel cross beam. A cover piece, such as a snapfit piece of plastic (e.g., PVC), may be mounted to cross piece 20 for decorative reasons.

In the embodiment of FIG. 2, bunk tray end supports 60,62 (which are mounted typically to the sides of the vehicle in the sleeper compartment thereof) are also shown. In addition, an HVAC cover 64 is shown. Cover 64 fits within the region 66 of compartment 42 to enclose an HVAC unit if included at this location. The cover 64 is optional. In FIG. 2, one can see that openings are provided in cover 64 for the passage of air to the HVAC unit if included therein. In addition, openings may be provided in the front panel of compartment 42 to admit air to the compartment and to any HVAC unit contained therein. The illustrated compartment 40 is provided with first and second divider receiving receptacles 70,72. The illustrated form of receptacles comprise respective spaced apart parallel U-shape wall portions which each define a slot therebetween. Although this form of divider receptacle is advantageous, any suitable form of divider support may be used. An upright partition 74 fits within slot or receptacle 70. An upright partition 76 fits within the slot 72. Partitions 74,76 may be removable to change the configuration of the storage compartment 40. Also, electrical components, such as electrical modules, may be mounted thereto. Electrical wiring 80 is also shown in FIG. 2. Respective lights 82,84 and 86 are coupled from this wiring through a switch to an electrical source. The wiring 80 and lights 82,84 and 86 may be attached to the underside of tray 12. The lights illuminate the interior of the compartment. The switch may be actuated when the tray is raised to cause these lights to turn on. Portions of the wiring 80 may be sandwiched between upper and lower sections (not shown in FIG. 2) which together define the mattress receiving tray 12.

Figure 3:
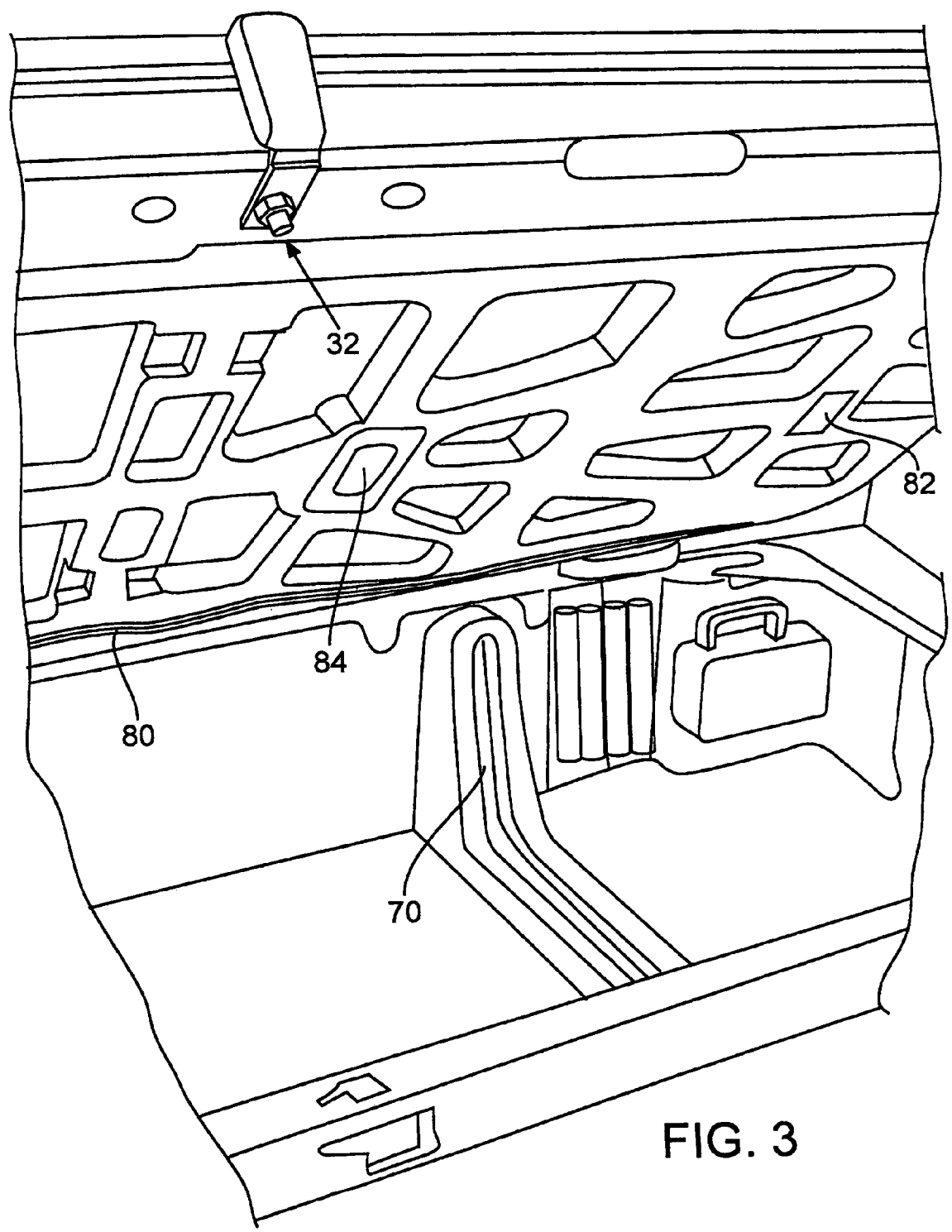
FIG. 3 illustrates a portion of a bunk configuration with the bunk lid in a raised position and without a divider in one of the divider receiving receptacles of the form shown in FIG. 3.

FIG. 3 shows some of the wiring 80 exposed. Lights 82 and 84 are also indicated in FIG. 3. The divider 74 is not installed in the FIG. 3 embodiment.

Figure 4:
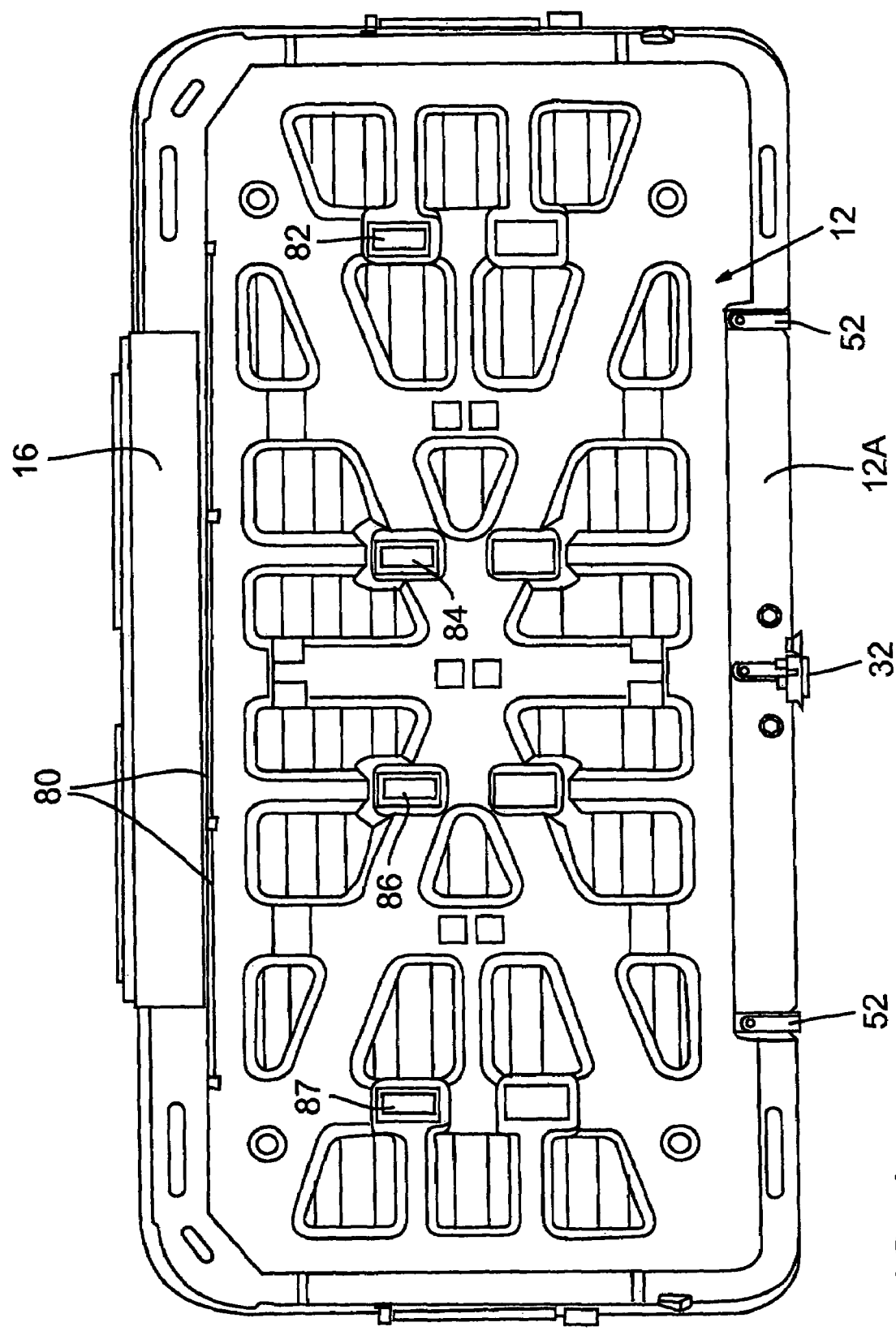
FIG. 4 is a bottom view of an embodiment of a lower portion of a bunk receiving tray.

FIG. 4 illustrates one embodiment of a lower tray section 12A of tray 12. In the embodiment of FIG. 4, four of the underside lights are provided including light 87. As can be seen in FIG. 4, the wires 80 are coupled to the tray section 12A along the rear of the tray section and then extend forwardly between the tray sections to the location of the respective lights 82,84, 86 and 87. Wire receiving passageways can be provided between the tray sections through which the wire can pass to the lights. For example, see the passageway 182 in FIG. 8 between two projections 180 that is overlaid by tray section 12B when components 12A and 12B are assembled. As also can be seen in FIG. 4, the illustrated form of hinge plate 16 is generally L-shape with a base section extending beneath the underside of tray section 12A where it may be riveted or otherwise fastened thereto. Also, the mattress retainers 52 may be L-shaped with a base portion extending along and being fastened to the undersurface of tray section 12A.

The various projections depicted in the underside of the tray assist in reinforcing the tray. In particular, as will be apparent from the figures discussed below, upwardly extending projections from the surface of tray section 12A, not visible in FIG. 4, may be provided to mate with corresponding receptacles in the other tray section (the undersurface of the top tray section) to provide additional support for these members. The tray sections may be fastened together.

Figure 5:
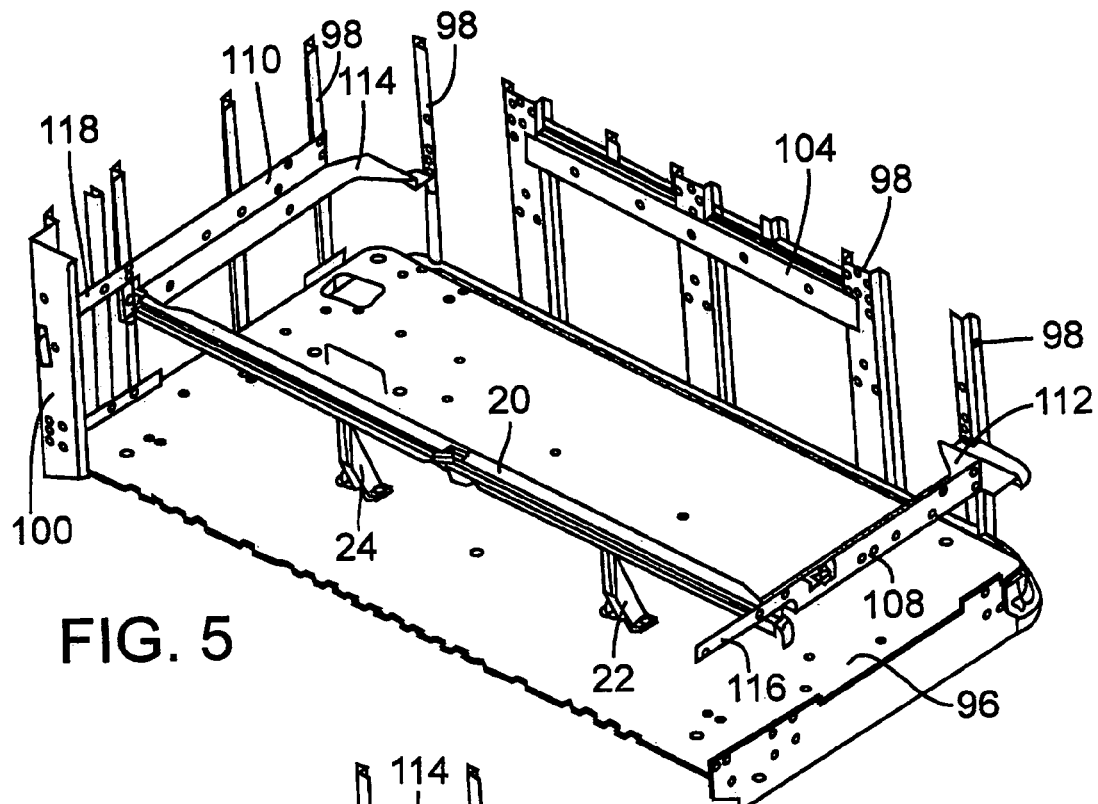
FIG. 5 illustrates an embodiment of a bunk tray supporting structure which may be mounted to a vehicle.

FIG. 5 illustrates a portion of a sleeping compartment of a vehicle having a floor 96 and upwardly extended rib members of various configurations, some of which are indicated at 98. The forward portion of the sleeper compartment may be defined by a post member 100 (one such member being positioned at each of the opposite sides of the vehicle with only one being shown in FIG. 5 for convenience). A cross piece 104 in the rear wall of the vehicle is positioned at the level of the hinge to provide support for mounting the hinge to the rear wall of the vehicle. Exemplary tray supporting side pieces 108,110 are shown in FIG. 5. Each of these side supports may include a respective rear portion 112,114 which wraps around the interior rear cover of the vehicle to engage a portion of the rear wall of the vehicle. In addition, the side supports 108,110 may have respective forwardly projecting portions 116,118. Extensions 116,118 may be eliminated or extended in length to accommodate sleeper compartments of various front-to-rear depths.

Figure 6:
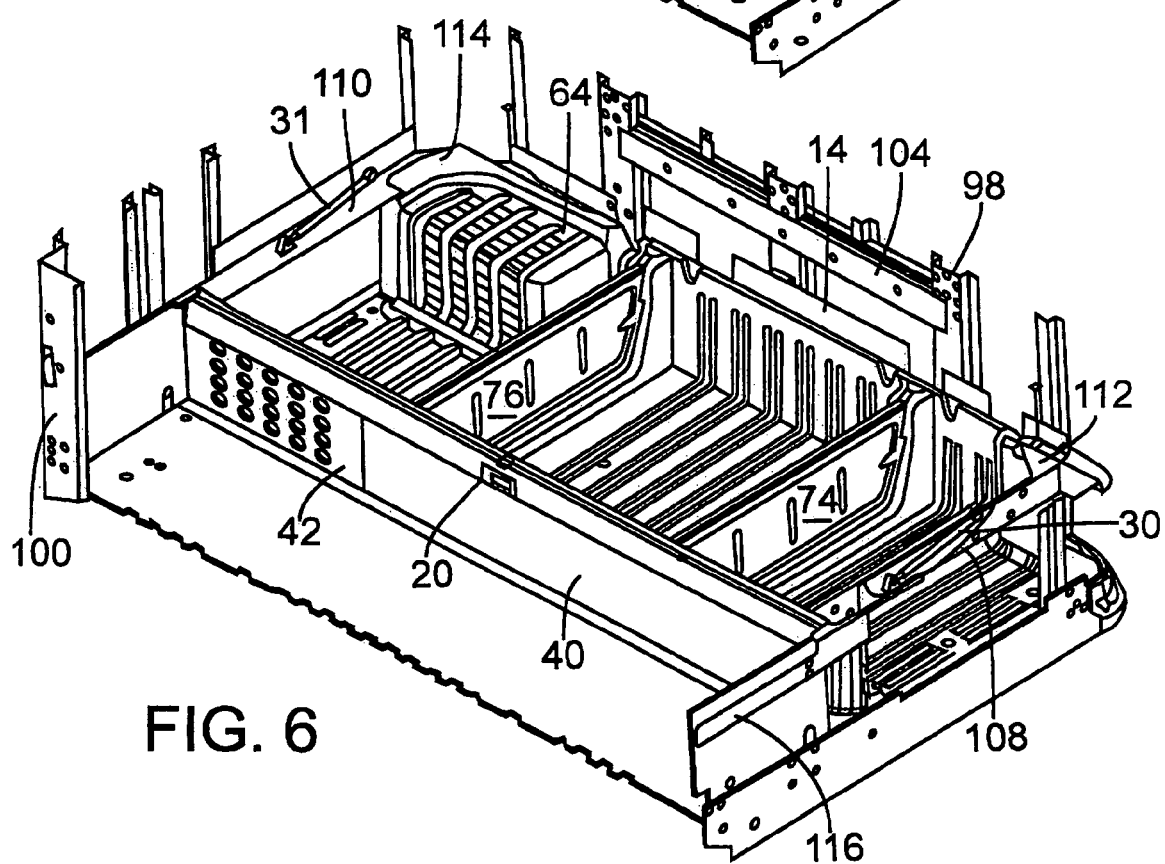
FIG. 6 illustrates an embodiment of a bunk configuration without the bunk receiving tray.

FIG. 6 is similar to FIG. 5 except that FIG. 6 includes the bunk compartment structure shown installed. In addition, both shocks 30,31 are visible in FIG. 6. Like components in FIG. 6, have been assigned like numbers to those previously discussed, such as in FIG. 1.

Figure 7:
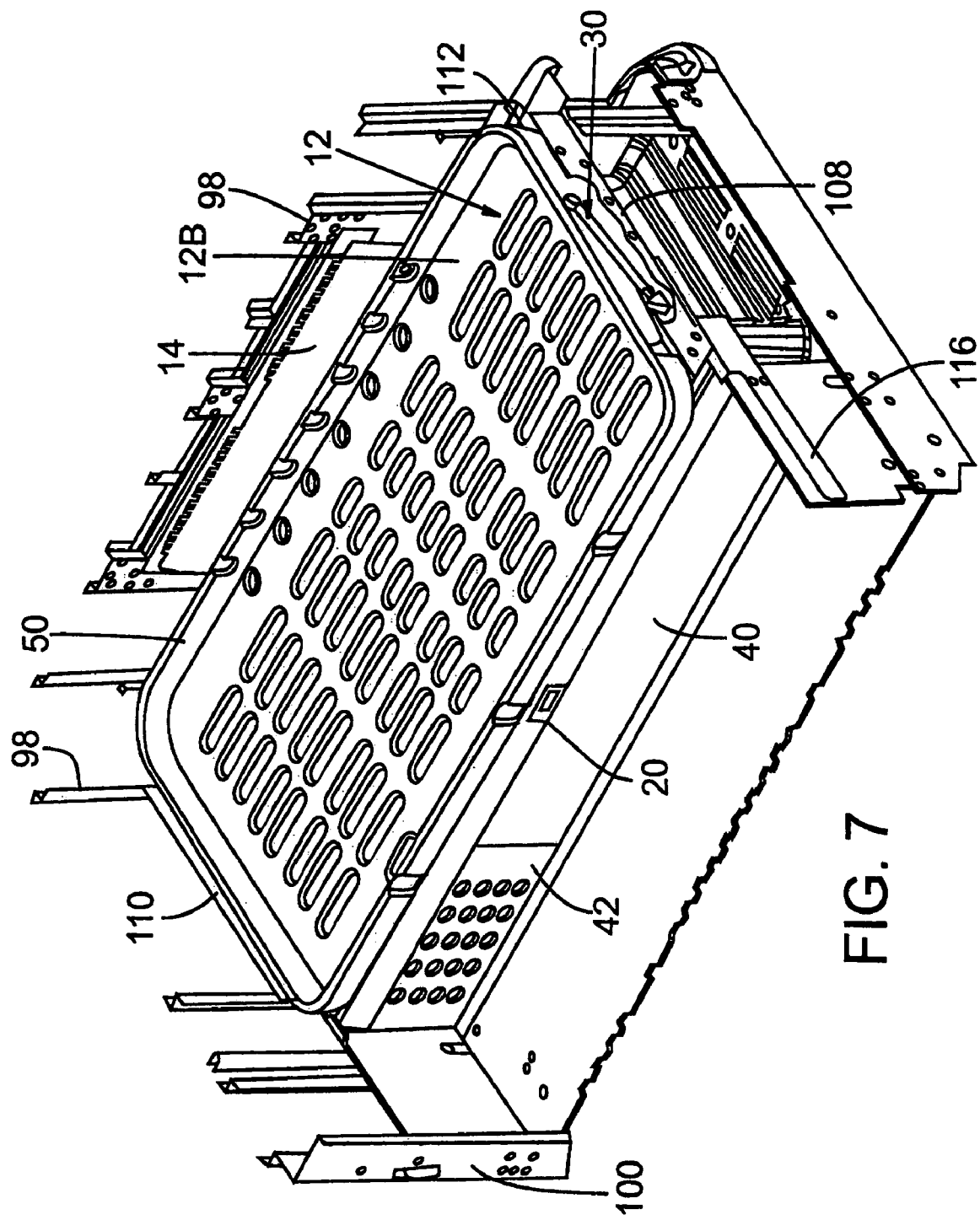
FIG. 7 illustrates the embodiment of FIG. 6 with the bunk receiving tray shown in a closed position.
Figure 8:
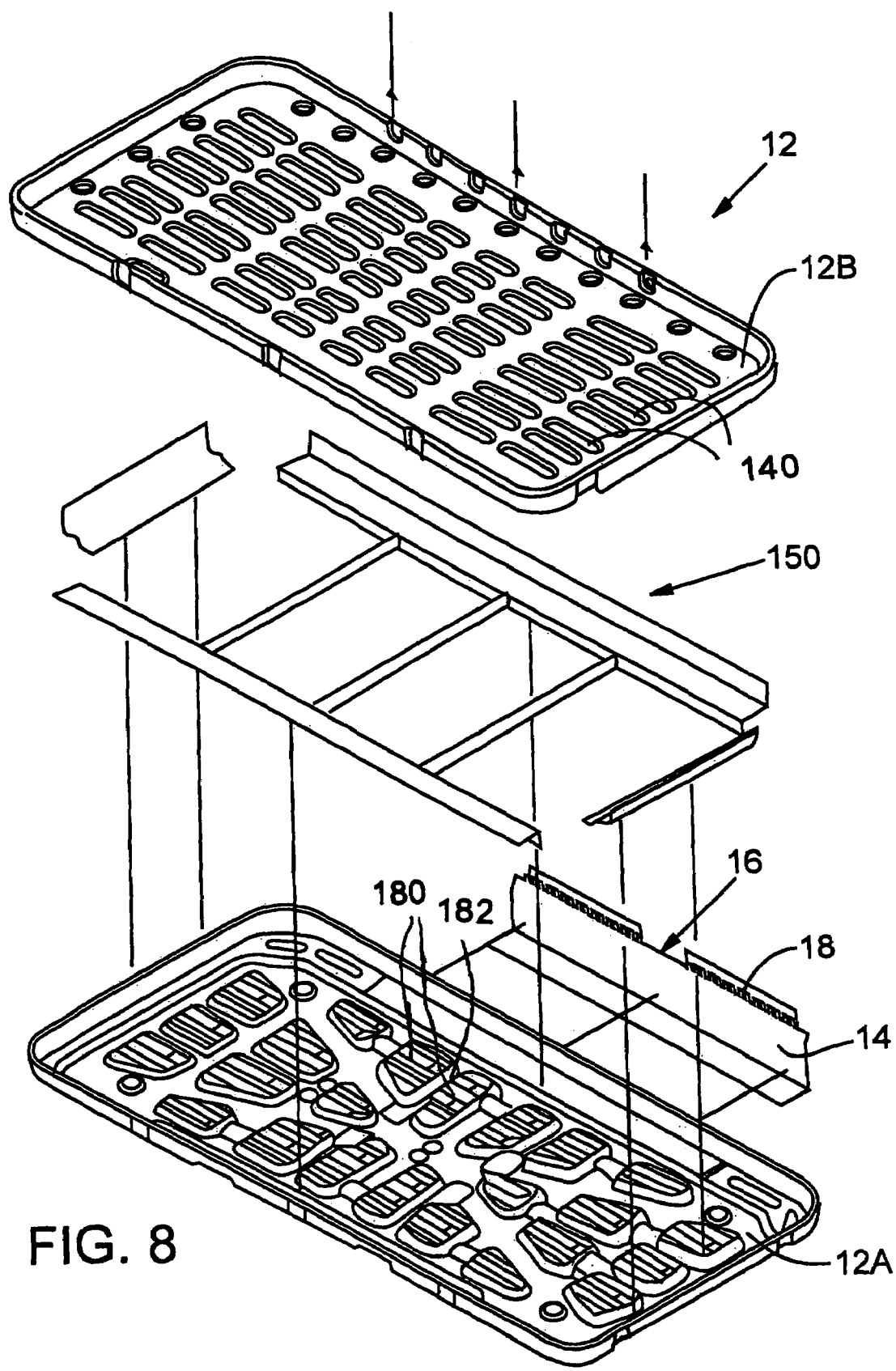
FIG. 8 illustrates an exploded view of one form of an embodiment of a bunk receiving tray.

FIG. 7 illustrates an embodiment of a bunk configuration with the bunk receiving tray shown in a closed position. The upper tray section 12B of tray 12 is indicated in FIG. 7. In addition, a number of recesses 140 (which correspond to projections at the opposite side of the tray 12B) are indicated in FIG. 8. These projections intermesh with projection receiving slots in tray section 12A to rigidify the construction.

In FIG. 8, the tray sections 12A and 12B are shown in an exploded view. Some intermediate reinforcing components indicated generally by the number 150 may also be used to rigidify the bunk receiving tray.

The lights discussed above may snap-fit into light receiving receptacles of the tray section 12A at the underside thereof. Wiring 80 at the rear edge of the tray may be supported by fasteners mounted to the underside of the tray. These fasteners may snap-fit into receptacles at the underside of the tray to hold the wire at such locations. Alternatively, wire clips or retainers may simply be mounted to the underside of the tray.

The side reinforcing members 108,110 are typically of a durable light material such as aluminum.

The upwardly extending flanges at the rear edge of the compartments 40,42 shown in FIG. 2 (some of which are indicated by number 162 and 164) may be riveted or otherwise attached to the back wall of the vehicle. These components may be releasably attached if desired. A groove may be defined along the back edge of the compartments 40,42 (e.g., between partition receiving components 70,72 and flanges 162,164). Such a groove, if provided, may support or accommodate a wiring bundle for electrical components of the vehicle.

Although not required, in the construction described above, desirably the compartments 40,42 do not support the bunk receiving tray 12 as the tray is supported instead by the hinge and by the respective side elements 108,110 and front support 20.

Any of a number of electrical component modules may be mounted to the partitions 74,76. For example, power components, a transmission electronic control unit and a low voltage disconnect, as well as other such modules and components. These components are easily accessible and are protected within the compartments. Also, these modules may be coupled by plug and connectors to a mating connector on a wiring harness for easy electrical coupling thereto. The components may be installed onto the dividers prior to placing the dividers within the compartments.

The tray may be formed of a durable polymer material (as well as the compartments 40,42 and partitions 74,76). For example, high density polyethylene may be used.

Having illustrated and described the principles of our invention with respect to several embodiments, it should be apparent to those of ordinary skill in the art that these embodiments may be modified in arrangement and detail without departing from the principles of our invention. All such modifications are included within our invention.

The invention claimed is:

1. A lower bunk apparatus for a vehicle having a sleeping compartment with a rear wall and first and second side walls separated by a first width, the lower bunk apparatus comprising:
    a mattress receiving receptacle comprising front, rear and side edge portions and being movably coupled to the rear wall to permit raising and lowering of the receptacle between raised positions and a lowered position, the mattress receiving receptacle comprising an upper mattress supporting surface and an upwardly projecting mattress retainer extending at least partially along the front, rear and side edge portions of the mattress receptacle;
    an upwardly opening storage compartment comprising a first section and a second section, the first section having a length that is more than one-half the first width; and
    wherein, when in the lowered position, the mattress receiving receptacle overlies the storage compartment, and wherein moving of the mattress receptacle to one said raised position provides access to the first section and to the second section of the storage compartment from above.

2. The lower bunk apparatus of claim 1 wherein the mattress receiving receptacle has a rear portion pivoted to the rear wall.

3. The lower bunk apparatus of claim 1 wherein the mattress receiving receptacle is pivoted to the rear wall of the vehicle by a hinge, the hinge comprising a first hinge plate and a second hinge plate, the first hinge plate being attached to the mattress receiving receptacle and the second hinge plate being attached to the rear wall of the vehicle.

4. The lower bunk apparatus of claim 1 wherein the mattress retainer comprises an upwardly projecting mattress retaining lip extending at least partially along each of the side edge portions of the mattress receiving receptacle and at least partially along each of the front and rear edge portions of the mattress receiving receptacle.

5. The lower bunk apparatus of claim 4 further comprising a mattress and plural spaced apart mattress retainers coupled to the mattress receiving receptacle for assisting in retaining the mattress on the receptacle.

6. The lower bunk apparatus of claim 1 wherein the first section and the second section together entirely span the first width and wherein the mattress receiving receptacle comprises a cover for an access opening for the first and second sections such that moving the mattress receiving receptacle upwardly to the one said raised position allows access to the first section and also to the second section through the access opening.

7. A lower bunk apparatus for a vehicle having a sleeping compartment with a rear wall and first and second side walls separated by a first width, the lower bunk apparatus comprising:
    a mattress receiving receptacle movably coupled to the rear wall to permit raising and lowering of the receptacle between raised positions and a lowered position;
    an upwardly opening storage compartment comprising a first section and a second section, the first section having a length that is more than one-half the first width; and
    wherein, when in the lowered position, the mattress receiving receptacle overlies the storage compartment; and
    wherein the receptacle comprises front and rear edge portions and first and second side edge portions, the apparatus comprising a cross-member extending between the side walls and positioned to support the front edge portion of the receptacle, the apparatus comprising first and second side supports coupled respectively to the first and second side walls and positioned to respectively support the first and second side edge portions of the receptacle.

8. The lower bunk apparatus of claim 7 wherein the apparatus further comprises at least one upright support spaced from the side supports and positioned to support the cross-member.

9. A lower bunk apparatus for a vehicle having a sleeping compartment with a rear wall and first and second side walls separated by a first width, the lower bunk apparatus comprising:
    a mattress receiving receptacle movably coupled to the rear wall to permit raising and lowering of the receptacle between raised positions and a lowered position;
    an upwardly opening storage compartment comprising a first section and a second section, the first section having a length that is more than one-half the first width; and
    wherein, when in the lowered position, the mattress receiving receptacle overlies the storage compartment; and wherein the first section of the storage compartment comprises at least one divider receiving slot for receiving an upright divider.

10. The lower bunk apparatus of claim 9 wherein the first section of the storage compartment comprises plural spaced apart divider receiving slots and at least one removable divider positioned in one of the divider receiving slots.

11. The lower bunk apparatus for a vehicle having a sleeping compartment with a rear wall and first and second side walls separated by a first width, the lower bunk apparatus comprising:
  a mattress receiving receptacle movably coupled to the rear wall to permit raising and lowering of the receptacle between raised positions and a lowered position;
  an upwardly opening storage compartment comprising a first section and a second section, the first section having a length that is more than one-half the first width: and
  wherein, when in the lowered position, the mattress receiving receptacle overlies the storage compartment; and
  wherein the second section of the storage compartment comprises a front panel that includes a plurality of apertures.

12. A lower bunk apparatus for a vehicle having a sleeping compartment with a rear wall and first and second side walls separated by a first width, the lower bunk apparatus comprising:
  a mattress receiving receptacle movably coupled to the rear wall to permit raising and lowering of the receptacle between raised positions and a lowered position;
  an upwardly opening storage compartment comprising a first section and a second section, the first section having a length that is more than one-half the first width; and
  wherein, when in the lowered position, the mattress receiving receptacle overlies the storage compartment; and
  wherein the mattress receiving receptacle comprises an upper mattress supporting tray portion and a lower tray portion fastened to the upper portion, the upper mattress supporting tray portion comprising plural downwardly extending projections and the lower tray portion comprising plural upwardly opening receptacles for receiving and mating with the projections to provide added support to the upper mattress supporting tray portion.

13. The lower bunk apparatus of claim 12 wherein the upper mattress supporting tray portion and lower tray portion define wire receiving passageways therebetween.

14. The bunk apparatus of claim 13 comprising plural lights coupled to the lower tray portion.

15. A lower bunk assembly for a vehicle having a sleeping compartment with a rear wall and first and second spaced apart side walls, the lower bunk apparatus comprising:
  a mattress receiving tray pivotally coupled to the rear wall for pivoting movement between a lowered position and various raised positions, the mattress receiving tray comprising an upper mattress supporting tray portion and a lower tray portion fastened to the upper portion, the upper mattress supporting tray portion comprising plural downwardly extending projections and the lower tray portion comprising plural upwardly opening receptacles for receiving and mating with a plurality of the projections to provide added support to the upper mattress supporting tray portion, the mattress receiving tray further comprising a mattress retaining projection positioned along at least a portion of the perimeter of the upper mattress supporting tray portion; and
  a storage bin positioned beneath the mattress receiving tray when the mattress receiving tray is in the lower position, and wherein the mattress receiving tray comprises a lid for the storage bin when the mattress receiving tray is in the lowered position.

16. A vehicle having a sleeping compartment with a rear wall, and first and second side walls, the vehicle comprising a lower bunk apparatus comprising:
  a lower bunk mattress supporting tray pivotally coupled to the rear wall of the sleeping compartment, the tray being adapted to support a mattress in a horizontal orientation when the tray is in a lowered position, the tray also being pivotable to raised positions from the lowered position;
  a storage compartment comprising an interior with a longer section and a shorter section, the longer section extending from a first side wall of the sleeping compartment a distance greater than one-half of the first side wall to second side wall width of the sleeping compartment and the shorter section extending at least along a portion of the width of the sleeping compartment that is not occupied by the longer section, at least one access opening communicating with the interior of the storage compartment from above; and
  wherein the lower bunk mattress supporting tray overlies the storage compartment and the at least one access opening when the tray is in the lowered position, access being provided to both the longer section and the shorter section without requiring the movement of an intermediate access opening cover positioned between the mattress supporting tray and the at least one access opening, the storage compartment through the at least one access opening, access being provided to the longer section and to the shorter section of the storage compartment through the at least one access opening upon raising the mattress supporting tray.

17. An apparatus according to claim 16 comprising a tray supporting structure that is separate from the storage compartment.

18. An apparatus according to claim 16 wherein the mattress supporting tray entirely overlies the storage compartment when the tray is in the lowered position.

19. A lower bunk apparatus for a vehicle with an extended cab having a rear wall and first and second side walls, the lower bunk apparatus comprising:
  a mattress receiving tray comprising an upper section and a lower section, front and rear edge portions and side edge portions, the tray being moveably coupled to the rear wall of the extended cab, the upper section comprising projections and the lower section comprising projection receiving receptacles, a plurality of said projections mating with a plurality of said receptacles to provide support to the upper section, the tray being moveable between upper and lower positions and to a lowered closed position;
  a cross member extending from the first side wall to the second side wall, the cross member being positioned to support the front edge portion of the tray when the tray is in the lowered closed position;
  a first side support coupled to the first side wall in a position to support one of the tray side edge portions when the tray is in the lowered closed position, a second side support coupled to the second side wall in a position to support the side edge portion of the tray other than said one side edge portion when the tray is in the lowered closed position;

a storage compartment comprising a first longer section and a second shorter section, the first section having a length that is greater than one-half the first side wall to second side wall distance, the first section comprising at least two divider receiving slots spaced apart along the length of the first section and at least one removable storage compartment divider coupled to one of the divider receiving slots, the divider partitioning the first section of the storage compartment; and wherein when the mattress receiving tray is in the closed position, the tray is in a horizontal orientation and overlies the storage compartment.

20. An apparatus according to claim 19 wherein there are at least two of said removable dividers.

* * * * *